United States Patent
Chavers et al.

(10) Patent No.: US 7,263,661 B2
(45) Date of Patent: Aug. 28, 2007

(54) MULTI-FUNCTION DEVICE HAVING GRAPHICAL USER INTERFACE INCORPORATING CUSTOMIZABLE ICONS

(75) Inventors: A. Gregory Chavers, N. Richland Hills, TX (US); Christopher S. Faro, Lexington, KY (US); Nathan K. Klemperer, Lexington, KY (US); Jennifer L. Krouse, Lexington, KY (US); John S. Steele, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 206 days.

(21) Appl. No.: 10/424,591

(22) Filed: Apr. 28, 2003

(65) Prior Publication Data
US 2004/0216058 A1  Oct. 28, 2004

(51) Int. Cl.
*G06F 3/00* (2006.01)
(52) U.S. Cl. ............. 715/744; 715/745; 715/747; 715/835; 715/840; 399/81
(58) Field of Classification Search ........ 715/835–840, 715/846, 810, 700, 733–735, 738–740, 744–745, 715/748, 751–752, 961, 976–977, 747; 399/81
See application file for complete search history.

(56) References Cited

U.S. PATENT DOCUMENTS

| | | | |
|---|---|---|---|
| 4,656,603 A | | 4/1987 | Dunn |
| 4,811,240 A | | 3/1989 | Ballou et al. |
| 4,813,013 A | * | 3/1989 | Dunn .................. 715/763 |
| 5,371,844 A | | 12/1994 | Andrew et al. |
| 5,428,736 A | * | 6/1995 | Kahl et al. .............. 715/839 |
| 5,490,245 A | | 2/1996 | Wugofski |
| 5,559,947 A | | 9/1996 | Wugofski |
| 5,565,964 A | * | 10/1996 | Tashiro et al. .............. 399/83 |
| 5,600,776 A | | 2/1997 | Johnson et al. |
| 5,602,997 A | * | 2/1997 | Carpenter et al. .......... 715/764 |
| 5,619,636 A | * | 4/1997 | Sweat et al. ............ 715/500.1 |
| 5,666,500 A | | 9/1997 | Roberson |
| 5,673,405 A | * | 9/1997 | Tange ...................... 715/745 |
| 5,689,286 A | * | 11/1997 | Wugofski .................. 715/835 |

(Continued)

OTHER PUBLICATIONS

MicroSoft Windows XP Icons (Screendumps, pp. 1-4, 2001).*

*Primary Examiner*—Sy D. Luu
(74) *Attorney, Agent, or Firm*—David A. Mancino, Esq.

(57) ABSTRACT

A method for customizing the graphical user interface of a multi-function device includes the steps of: (a) providing a multi-function device including a multi-function unit and a document server, where the multi-function device includes three or more built-in functions such as copying, printing, scanning, faxing, and emailing, and the multi-function unit includes a graphical user interface originally configured to display standard icons representing the built-in functions, where the user may activate the standard icons to command the multi-function device to perform the associated built-in function; (b) selecting an additional function to be available on the multi-function device; and (c) automatically adding a new icon associated with the additional function to the graphical user interface of the multi-function unit. The additional function may include a proprietary, third-party application and the new icon associated with the additional function may be a logo and/or a phrase (such as a product name/trademark) associated with the proprietary, third-party application.

21 Claims, 7 Drawing Sheets

U.S. PATENT DOCUMENTS

| | | | |
|---|---|---|---|
| 5,717,439 A * | 2/1998 | Levine et al. | 715/835 |
| 5,726,883 A | 3/1998 | Levine et al. | |
| 5,764,226 A | 6/1998 | Consolatti et al. | |
| 5,793,368 A | 8/1998 | Beer | |
| 5,867,163 A | 2/1999 | Kurtenbach | |
| 5,880,727 A * | 3/1999 | Barrett et al. | 715/854 |
| 5,950,000 A * | 9/1999 | O'Leary et al. | 717/105 |
| 5,966,126 A * | 10/1999 | Szabo | 715/762 |
| 6,069,624 A * | 5/2000 | Dash et al. | 715/866 |
| 6,275,225 B1 | 8/2001 | Rangarajan et al. | |
| 6,281,420 B1 * | 8/2001 | Suzuki et al. | 84/477 R |
| 6,313,736 B1 | 11/2001 | Hymel et al. | |
| 6,337,699 B1 * | 1/2002 | Nielsen | 715/837 |
| 6,344,859 B1 * | 2/2002 | Alimpich et al. | 715/762 |
| 6,359,572 B1 | 3/2002 | Vale | |
| 6,396,464 B2 | 5/2002 | Yokota et al. | |
| 6,411,836 B1 | 6/2002 | Patel et al. | |
| 6,421,509 B1 * | 7/2002 | Nomura et al. | 399/81 |
| 6,434,745 B1 | 8/2002 | Conley, Jr. et al. | |
| 6,453,132 B2 | 9/2002 | Ishikura | |
| 6,456,307 B1 * | 9/2002 | Bates et al. | 715/838 |
| 6,462,760 B1 * | 10/2002 | Cox et al. | 715/835 |
| 6,469,722 B1 * | 10/2002 | Kinoe et al. | 715/837 |
| 6,507,716 B2 | 1/2003 | Nomura et al. | |
| 6,857,105 B1 * | 2/2005 | Fox et al. | 715/825 |
| 6,904,568 B2 * | 6/2005 | Colgrove | 715/839 |
| 2001/0026699 A1 | 10/2001 | Ishikura | |
| 2001/0055038 A1 * | 12/2001 | Kim | 345/810 |
| 2002/0015598 A1 | 2/2002 | Maeda et al. | |
| 2002/0023059 A1 * | 2/2002 | Bari et al. | 705/76 |
| 2002/0054090 A1 | 5/2002 | Silva et al. | |
| 2002/0055855 A1 | 5/2002 | Cule et al. | |
| 2002/0085031 A1 | 7/2002 | Conrado et al. | |
| 2002/0085037 A1 | 7/2002 | Leavitt et al. | |
| 2002/0105534 A1 | 8/2002 | Balassanian | |
| 2002/0136563 A1 | 9/2002 | Maeda et al. | |
| 2002/0186257 A1 | 12/2002 | Cadiz et al. | |
| 2003/0020762 A1 | 1/2003 | Budrys et al. | |
| 2003/0052926 A1 * | 3/2003 | Dunlap et al. | 345/841 |
| 2004/0051743 A1 * | 3/2004 | Gonsho | 345/847 |
| 2004/0090470 A1 * | 5/2004 | Kim et al. | 345/846 |
| 2004/0113928 A1 * | 6/2004 | Kobayashi et al. | 345/700 |
| 2004/0119757 A1 * | 6/2004 | Corley et al. | 345/837 |

* cited by examiner

MULTI-FUNCTION DEVICE HAVING GRAPHICAL USER INTERFACE INCORPORATING CUSTOMIZABLE ICONS

BACKGROUND

Embodiments of the present invention relate to a multi-function network printing device; and more particularly, to a multi-function network printing device having a graphical interface incorporating customizable icons.

Conventional multi-function printers and network copiers (MFPs) are products that are designed to provide a variety of functions to a given business entity. These machines typically offer functions for copying, faxing, scanning, network printing, and emailing a scanned document. Such MFPs typically include a multi-function unit and a document server, such as Lexmark Document Distributor (LDD), each of which are operatively coupled to the computer network.

The multi-function unit may include a graphical user interface (GUI) that displays useful graphics and icons to the user, where the user may activate such icons to command the MFP to perform certain operations corresponding to the activated icon. The initial screen or display (such as the "welcome screen") on the GUI that a user encounters when using the MFP will typically contain graphical icons that represent base functions available to the user. For example, a default welcome screen for an MFP may include icons representing the function of copying, faxing, and scanning to email. Optionally, the MFP can be configured with profiles that enable a user to scan a document to an application on the computer network. These profiles can be used to scan a document to the LDD server, which provides functionality to integrate with a wide variety of proprietary, third-party software applications. However, one shortcoming of a conventional MFP is that it is not readily obvious to the user whether the particular MFP supports integration with any proprietary, third-party applications.

SUMMARY

In one embodiment, the present invention provides a method for customizing the multi-function unit's graphical user interface (GUI) to enable various graphics to be displayed, in icon form, for example, to better facilitate the user's understanding of which software applications the MFP supports and/or is integrated therewith. More specifically, graphics that are displayed on the GUI may be customizable in the form of logos, trademarks, or pictures readily identifiable with a particular software application or functionality. By configuring the GUI of the multi-function unit, it is apparent to even the casual user that the MFP supports integration at least with some of the illustrated software applications. For example, if the MFP includes the function of transmitting an electronic document handled by the MFP to a proprietary, third-party electronic archive application, the GUI can be customized to include an icon that includes a logo and/or a phrase (such as a product name/trademark) associated with the propriety, third-party electronic archive application. Likewise, if the MFP includes the function of transmitting an electronic document handled by the MFP to a server operating a proprietary, third-party electronic document management application, the GUI can be customized to include an icon having a logo and/or a phrase (such as a product name/trademark) associated with the proprietary, third-party document management application. Likewise, if the MFP includes the function of converting an electronic document handled by the MFP to a word-processor format handled by a proprietary, third-party word processor application, the GUI can be customized to include an icon having a logo and/or a phrase (such as a product name/trademark) associated with the proprietary, third-party word-processor application.

Accordingly, certain embodiments of the present invention allow the user/administrator to substitute any form of graphics (generally in the form of a picture and descriptive text) enabling the user to readily understand the associated functions that will be performed when the user activates the particular icon.

Therefore it is a first aspect of the present invention to provide a method for customizing a graphical user interface of a multi-function device that includes the steps of: (a) providing a multi-function device including a multi-function unit and a document server, where the multi-function device has three or more built-in functions such as copying, printing, scanning, faxing, and/or emailing, and where the multi-function unit has a graphical user interface originally configured to display standard icons representing the built-in functions, and where a user may activate the standard icons to command the multi-function device to perform associated built-in functions; and (b) customizing the graphical user interface of the multi-function unit, where the customizing step (b) includes: (i) a step of modifying the image of at least one of the standard icons; (ii) a step of adding an additional icon to the graphical user interface corresponding to an additional function activated on the multi-function device; and/or (iii) a step of adding an additional icon to the graphical user interface corresponding to a modification of one of the built-in functions. In the more detailed embodiment, the customizing step (b) includes the step of selecting an additional function to be available on the multi-function device and automatically adding an additional icon associated with the additional function to the graphical user interface.

In a more detailed embodiment, the additional function includes a proprietary, third-party application and the additional icon associated with the additional function is a logo and/or a phrase (such as a product name/trademark) associated with the proprietary, third-party application. In a more detailed embodiment, the proprietary, third-party application may be an electronic archive application, and the additional function includes the function of transmitting an electronic document handled by the multi-function device to the proprietary, third-party electronic archive application. This additional function may include the step of scanning a tangible document into the electronic document and the transmitting step may be performed by the document server. In an alternate detailed embodiment, the proprietary, third-party application may be an electronic document management application, and the additional function includes the function of transmitting an electronic document handled by the multi-function device to a server operating the proprietary, third-party electronic document management application. This additional function may include the step of scanning the tangible document into the electronic document and the transmitting step may be performed by the document server. In another alternate detailed embodiment, the proprietary, third-party application may be a word-processor application, and the additional function includes the function of converting an electronic document handled by the multi-function device to a word-processor format handled by the word-processor application. This additional function may include the step of scanning a tangible document into the electronic document and the converting step may be performed by the document server. In another alternate detailed embodiment, the proprietary, third-party application may be a specialized electronic mail application, and the additional function includes the function of transmitting an electronic document handled by the multi-function device to an electronic mail server handling the proprietary, third-party electronic mail application. This additional function may include the step of scanning a tangible document into the electronic document and the converting step may be performed by the document server.

In an alternate detailed embodiment of the first aspect of the present invention, the customizing step further includes the step of modifying the arrangement of icons on the graphical user interface. In a further detailed embodiment, the step of modifying the arrangement of icons on the graphical user interface includes the step of selecting one of a plurality of icon arrangement options.

In yet another alternate detailed embodiment of the first aspect of the present invention, the customizing step includes the step of modifying the image of at least one of the standard icons, where the modifying step includes the step of selecting a new icon from a plurality of available icon images. In a further detailed embodiment, the modifying step includes the step of resizing the selected new icon to a predetermined size and/or the modifying step further includes the step of providing a text title for the selected new icon.

In yet another further detailed embodiment of the first aspect of the present invention, the customizing step further includes the step of linking an icon to a manually activated switch provided on the multi-function unit (such as on a front panel of the multi-function unit).

In yet a further alternate detailed embodiment of the first aspect of the present invention, the customizing step includes the steps of adding an additional icon to the graphical user interface corresponding to an additional function activated on the multi-function device and selecting an additional function to correspond to the additional icon. In a further detailed embodiment, the adding step includes the step of selecting a new icon from a plurality of available icon images. In yet a further detailed embodiment, the adding step further includes the step of resizing the selected new icon to a predetermined size and/or includes the step of providing a text title for the selected new icon.

In yet another alternative detailed embodiment of the first aspect of the present invention, the customizing step includes the step of modifying the title of an icon.

In yet another alternate detailed embodiment of the first aspect of the present invention, the customizing is performed with the assistance of a graphical tool provided on the document server, or the customizing step is performed with the assistance of a graphical tool provided on the graphical user interface of the multi-function unit.

It is a second aspect of the present invention to provide a method for customizing the graphical user interface of a multi-function device that includes the steps of: (a) providing a multi-function device including a multi-function unit and a document server, where the multi-function device includes three or more built-in functions such as copying, printing, scanning, faxing, and emailing, and the multi-function unit includes a graphical user interface originally configured to display standard icons representing the built-in functions, where the user may activate the standard icons to command the multi-function device to perform the associated built-in function; (b) selecting an additional function to be available on the multi-function device; and (c) automatically adding a new icon associated with the additional function to the graphical user interface of the multi-function unit. In a further detailed embodiment, the additional function includes a proprietary, third-party application and the new icon associated with the additional function is a logo and/or a phrase (such as a product name/trademark) associated with the proprietary, third-party application.

In a yet a further detailed embodiment, the additional function includes a proprietary, third-party application and the additional icon associated with the additional function is a logo associated with the proprietary, third-party application. In a more detailed embodiment, the proprietary, third-party application may be an electronic archive application, and the additional function includes the function of transmitting an electronic document handled by the multi-function device to the proprietary, third-party electronic archive application. This additional function may include the step of scanning a tangible document into the electronic document and the transmitting step may be performed by the document server. In an alternate detailed embodiment, the proprietary, third-party application may be an electronic document management application, and the additional function includes the function of transmitting an electronic document handled by the multi-function device to a server operating the proprietary, third-party electronic document management application. This additional function may include the step of scanning the tangible document into the electronic document and the transmitting step may be performed by the document server. In another alternate detailed embodiment, the proprietary, third-party application may be a word-processor application, and the additional function includes the function of converting an electronic document handled by the multi-function device to a word-processor format handled by the word-processor application. This additional function may include the step of scanning a tangible document into the electronic document and the converting step may be performed by the document server. In another alternate detailed embodiment, the proprietary, third-party application may be a specialized electronic mail application (such as a secure email application), and the additional function includes the function of transmitting an electronic document handled by the multi-function device to an electronic mail server handling the proprietary, third-party electronic mail application. This additional function may include the step of scanning a tangible document into the electronic document and the converting step may be performed by the document server.

It is a third aspect of the present invention to provide a multi-function network printer that includes: (a) a network interface; (b) a printer module; (c) a scanner module; (d) a fax module; (e) a graphical user interface and; (f) a controller operatively coupled to the network interface, the printer module, the scanner module, the fax module, and the graphical user interface; where the controller runs a program that is configured to display standard icons on the graphical user interface representing available functions of the multi-function device and to operate one or more of the network interface, printer module, scanner module and fax module upon activation of one or more of the display icons; and where the controller has access to a customization program (or the results/output of a customization program) that is specifically adapted to allow a user to customize the display of the graphical user interface. In a further detailed embodiment, the customization program is further adapted to add functionality to the multi-function network printer and to select an additional icon corresponding to the added functionality. In yet a further detailed embodiment, the added functionality includes a proprietary, third-party application and the additional icon includes a logo and/or a phrase (such as a product name/trademark) associated with the proprietary, third-party application.

In an alternate detailed embodiment of the third aspect of the present invention, the customization program is further adapted to allow the user to modify the image of at least one of the standard icons by allowing the user to select from a plurality of available icon images. In a further detailed embodiment, the customization program is further adapted to allow the user to modify the size of the modified icon and/or the customization program is further adapted to allow the user to modify the title of the modified icon.

In yet another alternate detailed embodiment of the third aspect of the present invention, the customization program is further adapted to allow a user to modify the arrangement of icons on the graphical user interface.

In yet another detailed embodiment of the third aspect of the present invention, the multi-function network printer further includes a plurality of manually activated switches, and the customization program is further adapted to allow a user to link an icon displayed on the graphical user interface to at least one of the manually activated switches.

It is a fourth aspect of the present invention to provide a multi-function network printer device that includes: (a) a multi-function unit operatively coupled to a computer network and having two or more built-in functions such as, copying, scanning, and faxing and the multi-function unit includes a graphical user interface displaying standard icons representing the built-in functions, where the standard icons are activateable by a user to command the multi-function device to perform the associated built-in function; and (b) a document server operatively coupled to the computer network; where the graphical user interface of the multi-function unit further displays an additional icon corresponding with an additional function of the multi-function network printer device; and where the additional function of the multi-function network printer device includes a proprietary, third-party application and the additional icon corresponding with the additional function includes a logo and/or a phrase (such as a product name/trademark) associated with the proprietary, third-party application.

DETAILED DESCRIPTION

In one embodiment, the present invention provides a method for customizing the multi-function unit's graphical user interface (GUI) to enable various graphics to be displayed, in icon form, for example, to better facilitate the user's understanding of which software applications the MFP supports and/or is integrated therewith. More specifically, graphics that are displayed on the GUI may be customizable in the form of logos, trademarks, or pictures readily identifiable with a particular software application or functionality. By configuring the GUI of the multi-function unit, it is apparent to even the casual user that the MFP supports integration at least with some of the illustrated software applications. For example, if the MFP includes the function of transmitting an electronic document handled by the MFP to a proprietary, third-party electronic archive application, the GUI can be customized to include an icon that includes a logo and/or a phrase (such as a product name/trademark) associated with the propriety, third-party electronic archive application. Likewise, if the MFP includes the function of transmitting an electronic document handled by the MFP to a server operating a proprietary, third-party electronic document management application, the GUI can be customized to include an icon having a logo and/or a phrase (such as a product name/trademark) associated with the proprietary, third-party document management application. Likewise, if the MFP includes the function of converting an electronic document handled by the MFP to a word-processor format handled by a proprietary, third-party word processor application, the GUI can be customized to include an icon having a logo and/or a phrase (such as a product name/trademark) associated with the proprietary, third-party word-processor application. Likewise, if the MFP includes the function of transmitting an electronic document handled by the MFP via a specialized third-party email application, the GUI can be customized to include an icon having a logo and/or phrase (such as a product name/trademark) associated with the third-party electronic mail application.

Figure 1:
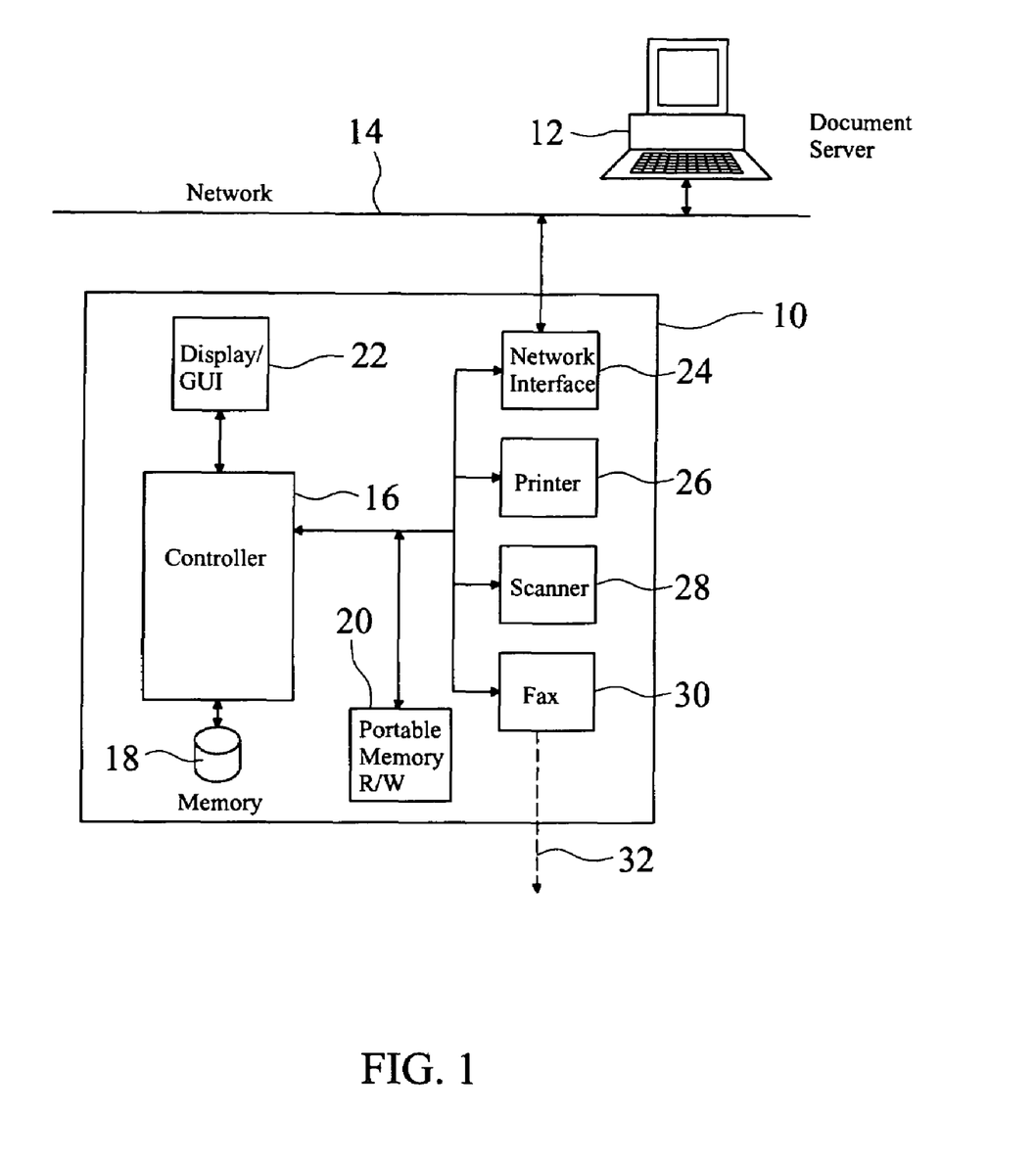
FIG. 1 is a schematic block-diagram presentation of a multi-function network printer device that includes an external document server.

As shown in FIG. 1, a multi-function network printer ("MFP") device includes a primary multi-function unit 10 and a document server 12 both of which are operatively coupled to (i.e., either a direct or wireless coupling), and communicate over a computer network 14. Of course, other computers, servers, printers, archives, and related devices may also be operatively coupled to the network as well, and may communicate with the multi-function unit and/or the document server over such network connection. It is also within the scope of the invention that the document server 12 be incorporated into the multi-function unit 10.

The multi-function unit 10 includes a controller 16 having access to an internal memory 18, which includes internal RAM and may also include an internal hard drive or a similar device. The controller may also be operatively coupled to a portable memory read/write device 20, such as a disk drive, R/W CD drive, and the like. This portable memory read/write device 20 may also be a read-only device, such as read-only CD drive. Also operatively coupled to the controller is a graphical-user-interface 22. The graphical-user-interface in the exemplary embodiment preferably utilizes an icon-based touch-screen (or similar) interface. Of course, it is within the scope of the invention to use any type of moveable-cursor-based interface, which would typically necessitate the use of a cursor-control device such as a mouse, a roller ball, or any similar cursor-control devices known by those of ordinary skill.

The multi-function unit 10 also includes a network interface 24 operatively coupled between the network 14 and the controller 16 for allowing the multi-function printer unit 10 to communicate over the computer network. The multi-function unit 10 also includes a printer module 26, operatively coupled to controller 16. The printer module 26 includes, for example, the necessary hardware and/or code that allows the multi-function printer unit 10 to print documents submitted over the network 14 or held in either of the memory devices 18, 20. The multi-function unit 10 may also include a scanner module 28, operatively coupled to the controller 16, which includes, for example, the necessary code and/or hardware for scanning tangible documents on the multi-function unit and storing the scanned electronic documents on an internal memory device 18, 20. Finally, the multi-function unit 10 may also include a fax module 30, which includes, for example, the necessary hardware and/or code for faxing electronic documents over a telephone line 32 or the like. The fax module may also have an internal scanning device for scanning tangible documents or may work with the scanning module 28 for scanning tangible documents and faxing documents over the telephone line 32.

The document server 12 works in concert with the multi-function unit 10 for performing special functions on electronic documents that may be handled by the multi-function unit 10. For example, the multi-function unit 10 can work in concert with the document server 12 for emailing electronic documents scanned by the multi-function unit 10 to a desired electronic address accessible over the network 14. The document server 12 may also include specialized functions for setting up and controlling the operations of the multi-function unit. It should also be apparent to those of ordinary skill that it is within the scope of the invention to combine the document server 12 and multi-function unit 10 into a single unit operatively coupled to the network 14.

Figure 2:
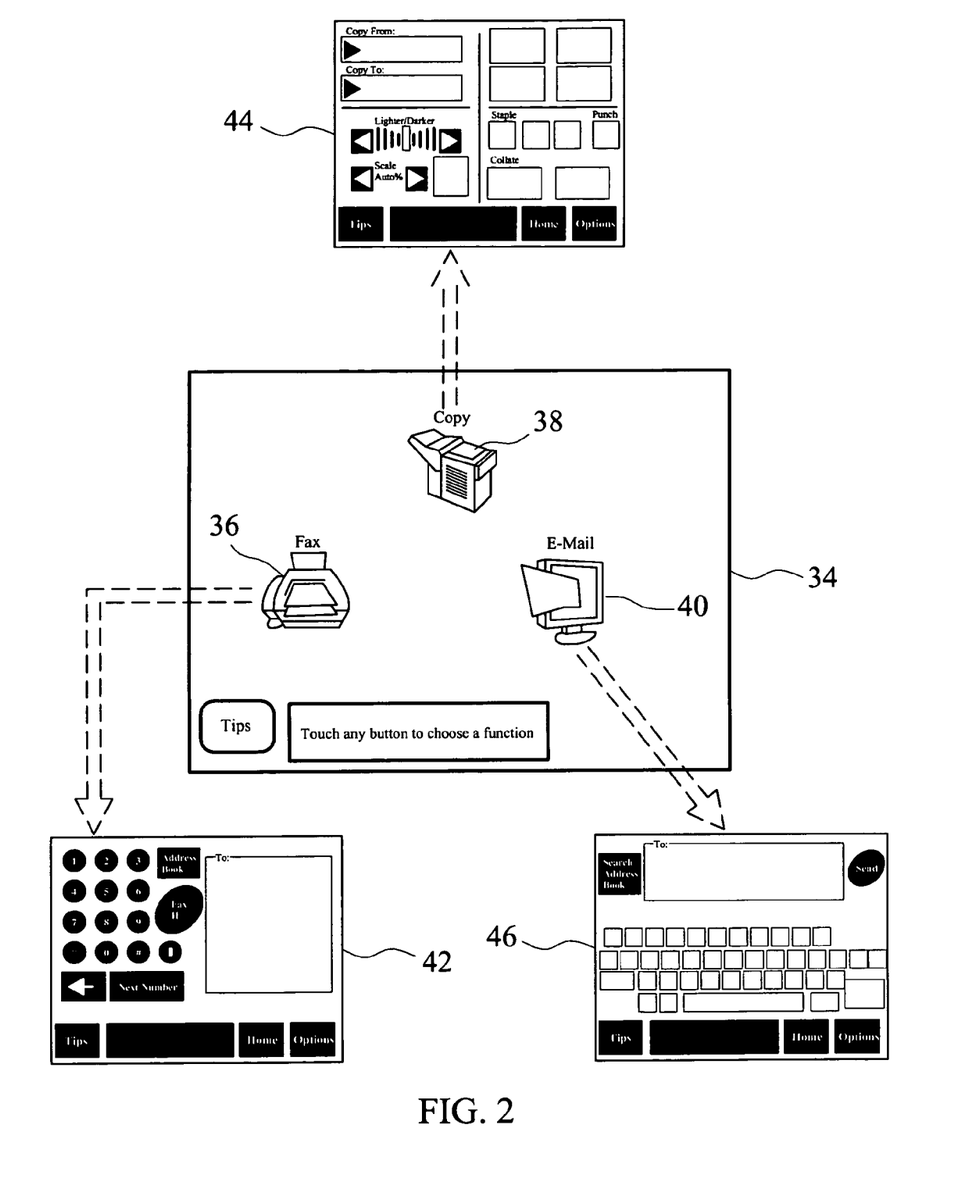
FIG. 2 is a diagram representing the "welcome" screen shot for a conventional multi-function printer, along with screen shots of graphical interfaces provided upon activation of the respective icons in the welcome screen.

As shown in FIG. 2, the MFP will have standard factory settings, prior to customization, to reflect basic functions of conventional multi-function network printer devices. As shown in FIG. 2, the initial welcome screen 34 on the graphical-user-interface 22 may include icons allowing the user to activate several basic functions of the MFP. As shown in FIG. 2, these pre-installed basic functions may include, for example, a faxing function represented by a fax icon 36, a copying function represented by a copying icon 38 and a scan-to-email function represented by the email icon 40. As also shown in FIG. 2, upon activating the fax icon 36, the graphical-user-interface will then provide a graphical interface 42 that includes icons and associated fields for allowing the user to fax an electronic document stored by or scanned into the multi-function unit 10 or over the network 14. Upon activating the copy icon 38, the graphical-user-interface will advance to a graphical interface 44 providing icons and fields for controlling the copying functions of the multi-function unit 10. Finally, upon activating the email icon 40, the graphical-user-interface will provide an interface 46 for allowing the user to type in an email message and attach electronic documents (either stored by the multi-function unit 10, scanned by the multi-function unit 10, stored on the server 12, or available over the network 14) to the email message, and send that email over to an electronic address over the network 14.

As discussed above, in one embodiment, the present invention is specifically designed to allow the graphical-user-interface 22 of the multi-function unit 10 of the MFP to be customized to display various graphics and icons to better facilitate the user's understanding of the software applications supported by the MFP. Additionally, if the MFP supports functions that include proprietary, third-party applications, the icons on the graphical-user-interface 22 may include logos associated with such proprietary, third-party applications.

Figure 3:
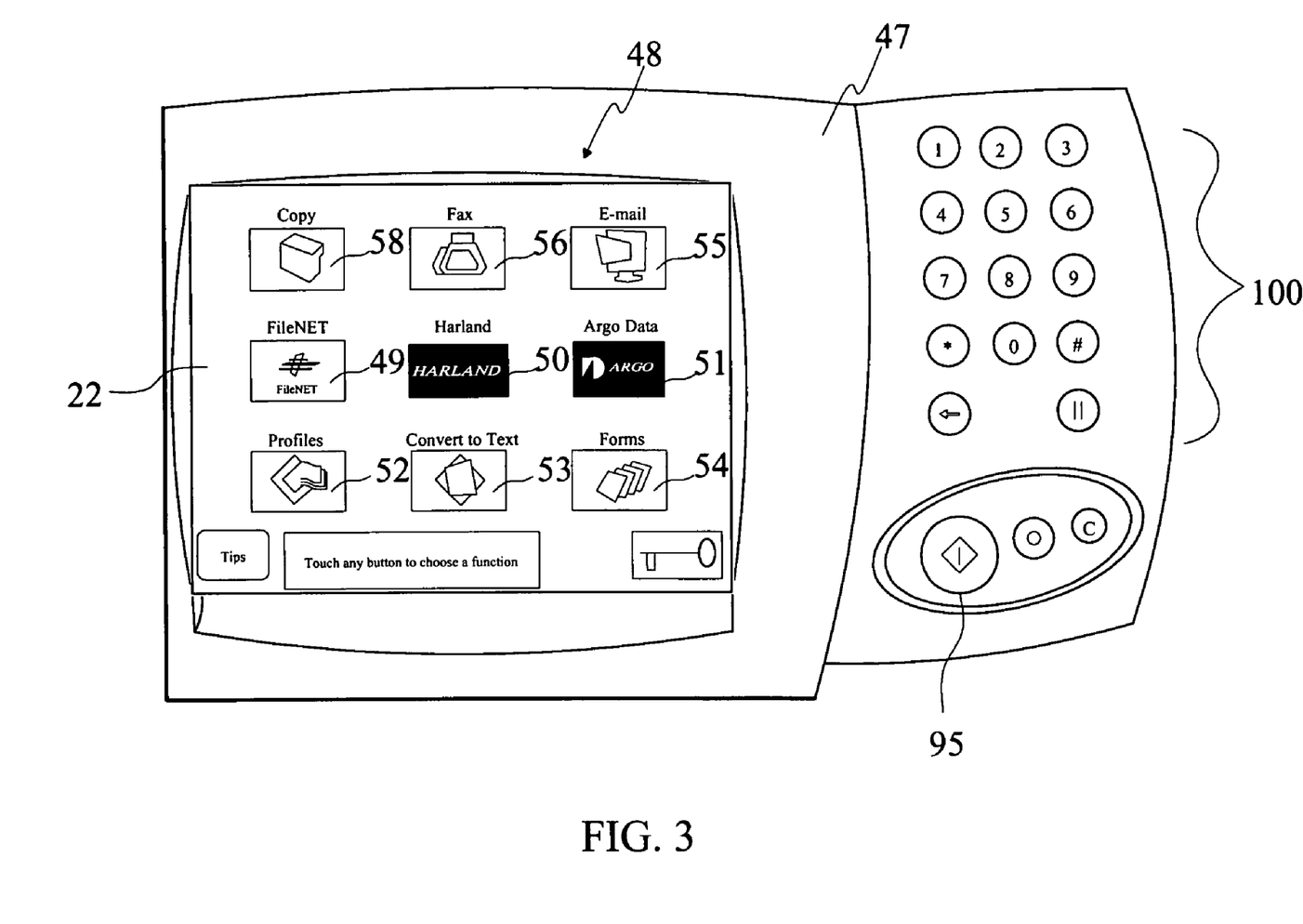
FIG. 3 is an example interface panel for a multi-function printer unit of the multi-function printer device according to an embodiment of the present invention, where the interface panel includes a graphical-user-interface "welcome screen" customized to illustrate additional proprietary-third-party functions through the use of logos associated with the proprietary-third-party applications.

As shown in FIG. 3, for example, an interface panel 47 of a multifunction unit includes a touch-screen graphical user interface 22. The welcome screen 48 of the graphical-user-interface 22 has been customized to include icons for activating functions of the MFP that utilize proprietary, third-party applications or icons for activating function of the MFP the utilize other non-proprietary applications. In the present example, the graphical-user-interface 22 has been customized for use with a financial institution. For example, activation of icon 49 will activate a function of the MFP that will transmit an electronic document handled by the MFP to a server operating a FileNet® document management application. If a tangible document is in the scanner module at the time of activation of the icon 49, the tangible document will be scanned into an electronic form and the electronic form will be transmitted by the document server to the server operating the FileNet® application. Likewise, activation of icon 50 will initiate a function of the MFP in which an electronic document handled by the MFP will be transmitted to a server operating a Harland® third-party secure email application. Again, if a tangible document is in the scanner module at the time of activation of the icon 50, the MFP will scan the tangible document into electronic form and the electronic document will thus be transmitted to the Harland® server. Likewise, activation of icon 51 will cause the MFP to initiate a function in which an electronic document (such as a loan application) handled by the MFP will be transmitted to a server operating an Argo Data® financial service application. Activation of icon 52 will allow the user to select a specific profile as discussed above. Activation of icon 53 will cause the MFP to convert text images in an electronic document handled by the MFP to a text document suitable for processing by a word-processor. Activation of icon 54 will allow the user to select or browse for forms handled by or accessible by the MFP, where the user will be then able to print or transmit the forms using the MFP. The user may also be able to electronically fill-in fields in the forms prior to printing, saving or transmitting. It can also be seen that icons 55, 56 and 58 represent basic MFP functions such as emailing, faxing and copying.

The customized graphical-user-interface 48 may also be customized to include additional or alternative icons such as: an icon representing a function that includes a step of transmitting an electronic document handled by the MFP to a server operating a proprietary, third-party electronic document management application, where the icon includes a logo and/or a phrase (such as a product name/trademark) associated with the proprietary, third-party electronic document management application; an icon representing an additional function that includes a step of converting text images of an electronic document handled by the multi-function device to a word-processor format handled by a third-party word-processor application, where the icon is a logo and/or a phrase (such as a product name/trademark) associated with the proprietary, third-party word-processor application; an icon representing a function of the MFP that includes the step of transmitting an electronic document handled by the MFP to a proprietary, third-party electronic archive application, where the icon is a logo and/or a phrase (such as a product name/trademark) associated with the proprietary, third-party electronic archive application; an icon representing a function for an electronic document handled by the MFP to be electronically transmitted by a proprietary, third-party electronic document transmission application, where the icon is a logo and/or a phrase (such as a product name/trademark) associated with the proprietary, third-party electronic document transmission program application; and an icon representing other specialized functions enabled on the MFP that utilize proprietary third-party applications, where the icon is a logo and/or a phrase (such as a product name/trademark) associated with the proprietary, third-party application. An example of an icon associated with a proprietary, electronic archive application is the DOCS Open icon 60 in the example welcome screen 62 shown in FIG. 8. An example of an icon associated with a third-party electronic document transmission application is the RPost icon 64 in the example welcome screen 62 shown in FIG. 8. Examples of icons associated with other specialized functions enabled on the MFP that utilize proprietary, third-party applications include the Bates Number icon 66 in the example welcome screen 62 shown in FIG. 8 and the EasyID icon 68 in the example welcome screen 70 shown if FIG. 9.

Figure 4:
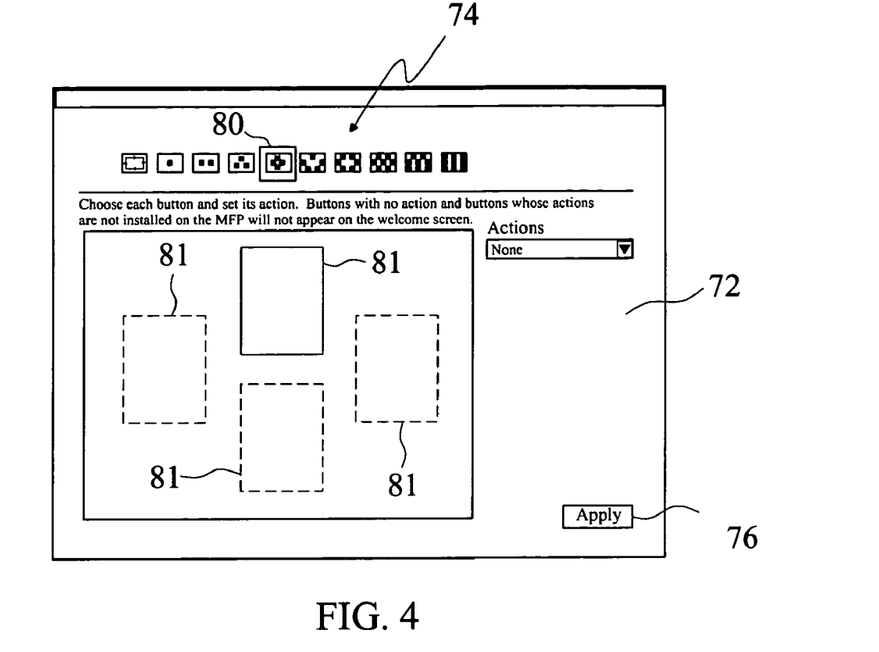
FIG. 4 is an example graphical-user-interface screen for a customization program used to configure the multi-function printer device according to an embodiment of the present invention, representing an initial step of the customization process.

FIG. 4 provides an initial screen of a customization "wizard" software tool operating on the document server 12 for customizing the functionality/operations and graphical-user-interface 22 of the MFP. The customization software tool may initially and automatically select certain standard functions of the multi-function network printer device such as copying, faxing and scanning; and then the user/administrator may then have the opportunity to add new functions, remove any of the base functions and/or modify the base functions of the MFP. The interface 72 shown in FIG. 4 allows the administrator/user to select the format or layout of the function icons on the graphical-user-interface 22. Once one of the layouts is selected from the layout menu 74, the administrator/user may hit the "apply" icon 76 and the set-up tool will advance to the next steps as shown in FIG. 5.

Figure 5:
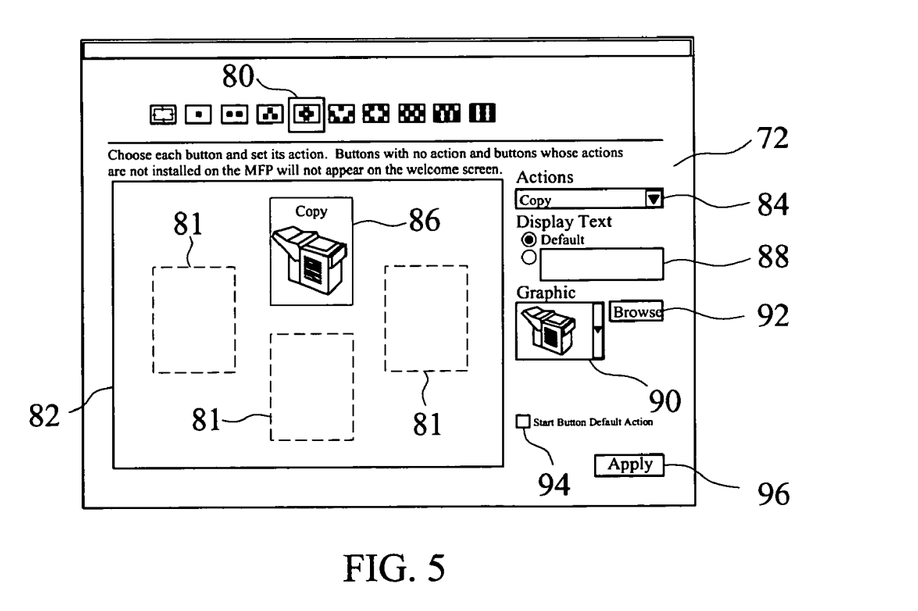
FIG. 5 is an example graphical-user-interface screen for a customization program for configuring the multi-function printer device according to an embodiment of the present invention, representing a next step of the customization process.

As shown in FIGS. 4 and 5, upon selection of a particular one of the layouts 80 in the layout menu 74, "blank" icons 81 are provided in layout window 82, An administrator/user can select one of the blank icons 81 in the layout window 82 and apply a particular function to that selected icon (e.g., by selecting a function from the "action" pull-down menu 84). As shown in FIG. 5, assuming that the "copy" function is selected in the pull-down menu 84 for the activated icon space 86, the set-up tool will then allow the user to utilize the default text for the "copy" icon or enter customized text or title for the icon in the title customization field 88. The set-up tool may also provide a menu 90 that allows the user to select stored graphical images for the selected function. These images may be stored in the internal memory 18/20 of the multi-function printing unit 10 or may be accessible over the network 14 by the administrator/user if the administrator selects the "browse" icon 92. Upon selection of an image, the tool will automatically re-size the image for the icon space.

This interface 72 also includes a field 94 that the user can activate/select; which, upon selection, will cause the "start button" (a manually actuated button or switch) 95 on the front panel 47 of the multi-function printer unit 10 (see FIG. 3) to perform the function selected in the pull-down menu 84. When the administrator/user is satisfied that this particular icon 86 has been properly set up, the administrator/user will activate the "apply" icon 96, which will cause the set up wizard to allow the administrator/user to set up the remaining icons 81 in the icon field 82 in a similar manner.

As mentioned above, the functions selected in the pull-down menu 84 may include the use of proprietary, third-party applications. In the exemplary embodiment, such functions are stored in the document server 12 in the form of scripts, which define the sequence of operations to be performed by the multi-function unit 10 and/or the document server 12 (and specific applications running on, or accessible by the document server). The document server can have the ability to allow the user or administrator to create and/or store such scripts so that they can be selected by the pull-down menu 84. The logos or other images associated with such proprietary, third-party applications will typically thereafter be found by the administrator/user by browsing the network for such images after activating the 'browse' icon 92. It is also within the scope of the invention that the customization tool provides the user/administrator with the ability to create new scripts or modify stored scripts to create new functionality for the MFP.

Figure 6:
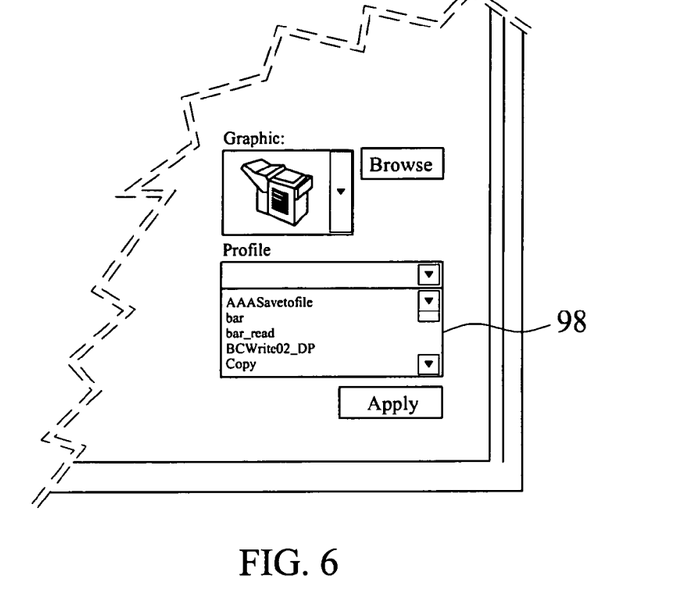
FIG. 6 is an example graphical-user-interface screen segment for a customization program used to configure the multi-function printer device according to an embodiment of the present invention, representing a progression from the step displayed in FIG. 5.

As shown in FIG. 6, the interface 72 may also provide the user/administrator with a pull-down menu 98 that allows the selection of a profile to be associated with the function. A profile in this environment is a script or set of instructions that control the methods/settings to be used to for a particular function. Profiles can be sent from a network device, such as server 12, to the unit 12, where it can be executed to, for example, capture, catalogue, route, etc. an electronic document. While in some embodiments, the profiles are static (e.g., non-interactive), they can also be dynamic (e.g., interactive).

Figure 7:
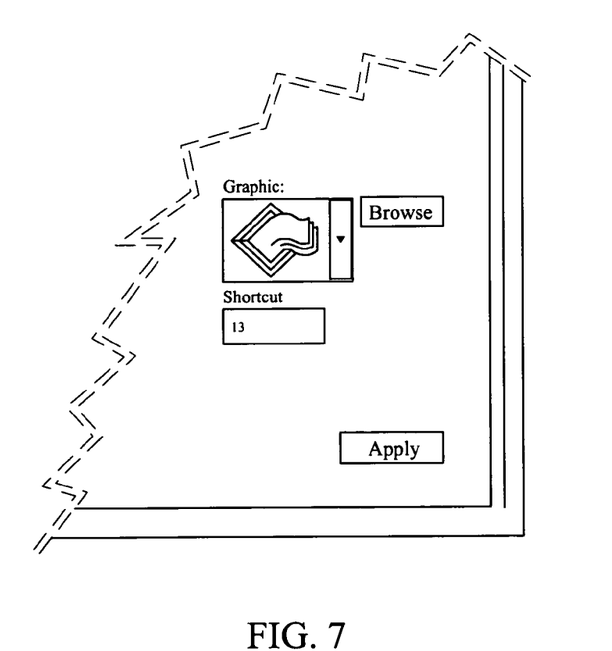
FIG. 7 is an example graphical-user-interface screen segment for a customization program used to configure the multi-function printer device according to an embodiment of the present invention, representing a progression from the step displayed in FIG. 6.

As shown in FIG. 7, the interface may also provide an additional field that will allow the user to specify a short-cut key or keys 100 on the interface panel 47 (see FIG. 3) to be associated with the function being defined such that upon activation of the key or keys 100, the function will be performed.

Once the customization tool has completed customizing the functionality of the MFP and/or the graphical-user-interface 22 of the multifunction unit 10, the document server 12 will transmit to the multi-function unit 10 the code, images and other instructions for storage in the memory 18 of the multi-function unit. Thereafter, the controller 16 of the multi-function unit 10 will control the graphical-user-interface 22 according to the customization codes, images, etc. stored in memory 18.

Figure 8:
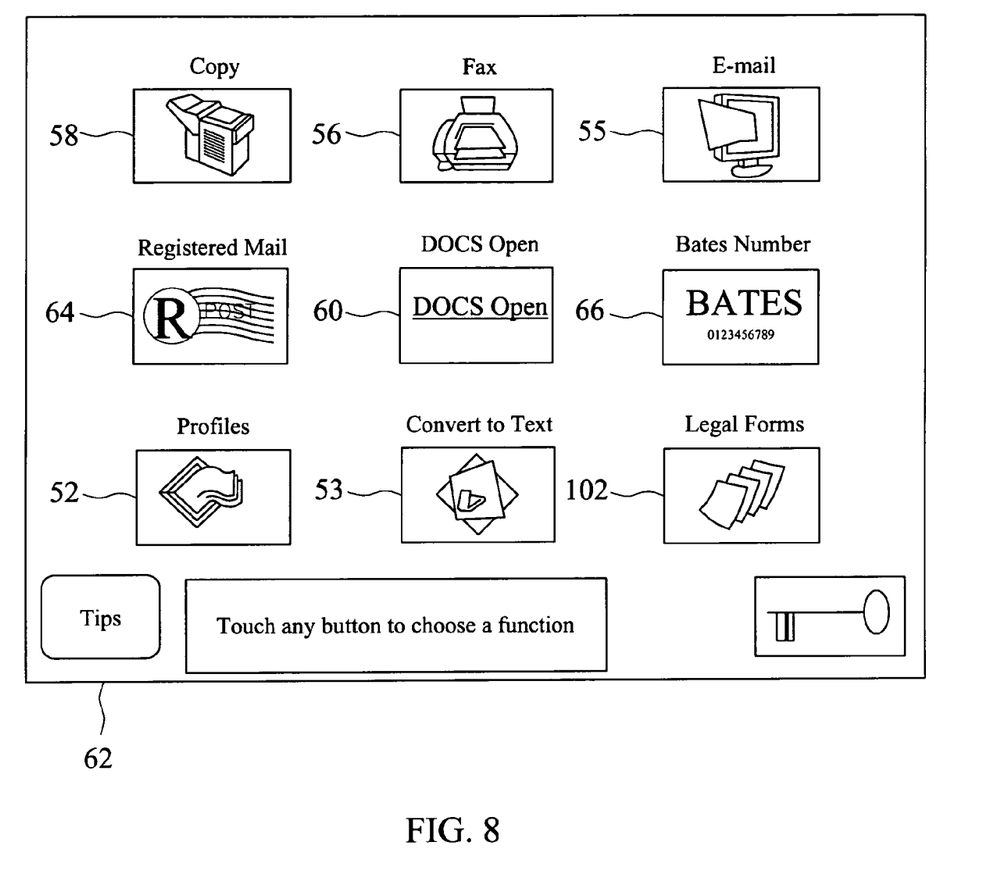
FIG. 8 is another example graphical-user-interface "welcome screen" customized to illustrate additional proprietary-third-party functions through the use of logos associated with the proprietary-third-party applications.

As shown in FIG. 8, the customization tool can be used to create a welcome screen 62 tailored for use in a legal office. This example customized graphical-user-interface 62 includes: a function providing the ability to annotate an electronic document handled by the multi-function device by adding a unique identifier to each page of the electronic document (e.g., Bates Number stamping) as shown by icon 66; a function providing the ability to scan a tangible document to an electronic document and to submit the electronic document to an electronic archive system accessible by the multi-function device (such as scanning and archiving to an DOCS Open® archive) as shown by icon 60; a function providing the ability to electronically mail an electronic document handled by the multi-function device as an electronic equivalent to a registered postal mail (e.g., RPost®) as shown by icon 64; a function providing the ability to scan a tangible document into an electronic document and to convert the text images of the electronic document into a word-processing format capable of being editing by a word-processor (e.g., WordPerfect® or Microsoft Word®) as shown by icon 53; and a function providing the ability for the user to access legal forms stored within the multi-function network printer device or accessible over the network 14, enter information into the forms (where certain information can be pre-entered in the forms based upon the user's profile or the client/matter numbers entered previously) and printing, faxing and/or emailing the filled-in form using the MFP as shown by icon 102.

Figure 9:
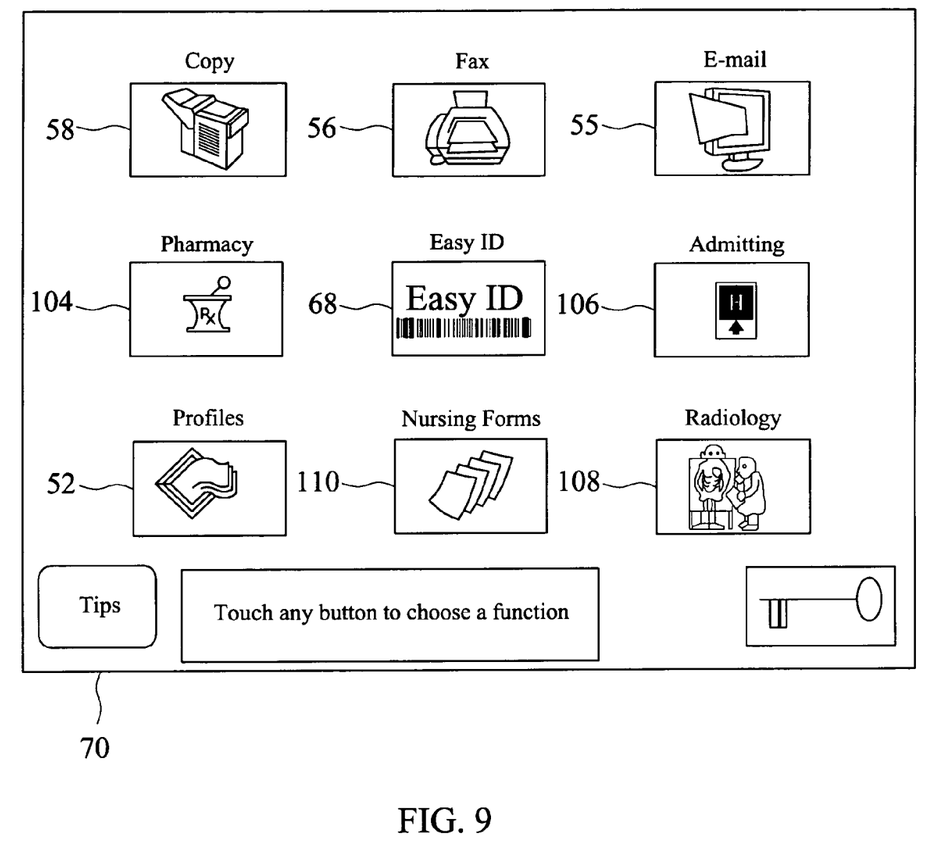
FIG. 9 is another example graphical-user-interface "welcome screen" customized to illustrate additional proprietary-third-party functions through the use of logos associated with the proprietary-third-party applications.

Likewise, as shown in FIG. 9, the customization tool can be used to create a welcome screen 70 tailored for use in a health-care facility. This example customized graphical-user-interface 70 includes: a function providing the ability to route an electronic document handled by the MFP to any network location accessible by the MFP (such as to the pharmacy as shown by icon 104, to the admitting desk as shown by icon 106, or to radiology as shown by icon 108); a function providing the ability to access and print commonly-used forms (where certain information can be pre-entered in the forms based upon the user's profile or the patient's information entered previously), such as nursing forms as shown by icon 110; and a function providing the ability to create wrist labels for patients based upon entered or accessed patient information as shown by icon 68.

Following from the above description and invention summaries, it should be apparent to those of ordinary skill in the art that, while the apparatuses and processes herein described constitute exemplary embodiments of the present invention, it is to be understood that the invention is not limited to these precise apparatuses and processes and that changes may be made therein without departing from the scope of the invention as defined by the claims. Additionally, it is to be understood that the invention is defined by the claims and it is not intended that any limitations or elements describing the exemplary embodiments set forth herein are to be incorporated into the meaning of the claims unless such limitations or elements or explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method for customizing the graphical user interface of a multi-function device, comprising the steps of:

providing a multi-function device including a multi-function unit and a document server, the multi-function device having three or more built-in fractions taken from a group consisting of: copying, printing, scanning, faxing, and e-mailing, and the multi-function unit having a graphical user interface originally configured to display standard icons representing the built-in functions, wherein the user may activate the standard icons to command the multi-function device to perform the associated built-in function; and customizing the graphical user interface of the multi-function unit, wherein the customizing step includes the following steps:

accessing an additional function beyond the built-in functions stored on the document server in the form of a set of instructions, the set of instructions defining a sequence of operations to be performed by at least one of the multi-function unit, the document server, a specific application running on the document server, and a specific application accessible by the document server;

associating a graphical image with the additional function;

transmitting from the document server to the multi-function unit at least a portion of the set of instructions and the graphical image associated with the additional function;

storing the portion of the set of instructions and the graphical image by the multi-function unit in memory; and adding an additional icon to the graphical user interface of the multi-function unit, the additional icon including at least a portion of the graphical image transmitted to the multi-function unit from the document server, and linking the additional icon to the portion of the set of instructions stored in memory such that activation of the additional icon initiates execution of the portion of the set of instructions.

2. The method of claim 1, wherein the customizing step further Includes the step of modifying the arrangement of icons on the graphical user interface.

3. The method of claim 2, wherein the step of modifying the arrangement of icons on the graphical user interface includes the step of selecting one of a plurality of icon arrangement options.

4. The method of claim 1, wherein:

the multi-function unit includes at least one manually actuated mechanism taken from a group consisting of a button, a switch and a key, the manually actuated mechanism being separate from the graphical user interface; and the customizing step further includes the step of linking the additional function to the manually actuated mechanism such that actuation of the manually actuated mechanism initiates execution of the portion of the set of instructions.

5. The method of claim 1, wherein the adding step further includes the step of resizing the additional icon to a predetermined size.

6. The method of claim 1, wherein the adding step further includes the step of providing a text title for the additional icon.

7. The method of claim 1, wherein the additional function includes operation of a proprietary third-party application residing on at least one of the document server and a computer networked with the multifunction device, and the additional icon includes a logo associated with the proprietary third-party application.

8. The method of claim 7, wherein:

the proprietary third-party application is an electronic archive application; and the additional function includes the function of transmitting an electronic document handled by the multi-function device to the proprietary, third-party electronic archive application.

9. The method of claim 8, wherein the additional function includes the step of scanning a tangible document into the electronic document.

10. The method of claim 8, wherein the transmitting step is performed by the document server.

11. The method of claim 7, wherein:
the proprietary third-party application is an electronic document management application; and
the additional function includes the function of transmitting an electronic document handled by the multi-function device to a server operating the proprietary, third-party electronic document management application.

12. The method of claim 11, wherein to additional function includes to step of scanning a tangible document into the electronic document.

13. The method of claim 11, wherein the transmitting step is performed by the document server.

14. The method of claim 7, wherein:
the proprietary third-party application is a word processor application; and
the additional function includes the function of converting an electronic document handled by the multi-function device to a word-processor format handled by the word processor application.

15. The method of claim 14, wherein the additional function includes the step of scanning a tangible document into the electronic document.

16. The method of claim 14, wherein the converting step is performed by the document server.

17. The method of claim 14, wherein:
the proprietary third-party application is an electronic mail application; and
the additional function includes the function of transmitting an electronic document handled by the multi-function device to the proprietary third-party electronic mail application.

18. The method of claim 17, wherein the additional function includes the step of scanning a tangible document into the electronic document.

19. The method of claim 1, wherein the customizing step is performed with the assistance of a graphical tool provided on the document server.

20. The method of claim 1, wherein the customizing step is performed with the assistance of a graphical tool provided an the graphical user interface of the multi-function unit.

21. A method for customizing the graphical user interface of a multi-function device, comprising the steps of:
providing a multi-function device including a multi-function unit and a document server, the multi-function device having multiple functions including: copying, printing, scanning, faxing, and c-mailing, and the multi-function unit having a graphical user interface originally configured to display standard icons representing at least a set of the multiple functions, wherein the user may activate the standard icons to command the multi-function device to perform the function; and
customizing the graphical user interface of the multi-function unit, wherein the customizing step includes the following steps:
accessing profile stored on the document server in the form of a set of instructions, the set of instructions controlling at least one of (a) a method and (b) a setting to be used for a function of the multi-function device;
associating a graphical image with the profile;
transmitting from the document server to the multi-function unit at least a portion of the set of instructions arid the graphical image associated with the profile;
storing the portion of the set of instructions and the graphical image by the multi-function unit in memory; and
adding an additional icon to the graphical user interface of the multi-function unit, the additional icon including at least a portion of the graphical image transmitted to the multi-function unit from the document server, and linking the additional icon to the portion of the set of instructions stored in memory such that activation of the additional icon initiates execution of the portion of the set of instructions.

* * * * *